(12) United States Patent
Yang et al.

(10) Patent No.: US 11,288,887 B2
(45) Date of Patent: Mar. 29, 2022

(54) OBJECT TRACKING METHOD AND APPARATUS

(71) Applicant: BEIJING BAIDU NETCOM SCIENCE TECHNOLOGY CO., LTD., Beijing (CN)

(72) Inventors: Xipeng Yang, Beijing (CN); Xiao Tan, Beijing (CN); Hao Sun, Beijing (CN); Shilei Wen, Beijing (CN); Errui Ding, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 82 days.

(21) Appl. No.: 16/869,411

(22) Filed: May 7, 2020

(65) Prior Publication Data

US 2021/0110168 A1 Apr. 15, 2021

(30) Foreign Application Priority Data

Oct. 10, 2019 (CN) .......................... 201910959616.4

(51) Int. Cl.
*G06V 20/54* (2022.01)
*G06V 10/20* (2022.01)
(Continued)

(52) U.S. Cl.
CPC ............ *G06V 20/54* (2022.01); *G06V 10/255* (2022.01); *G06V 10/42* (2022.01); *G06V 10/56* (2022.01);
(Continued)

(58) Field of Classification Search
USPC ....................................................... 382/103
See application file for complete search history.

(56) References Cited

U.S. PATENT DOCUMENTS 7,450,735 B1 * 11/2008 Shah ...................... G06T 7/292
348/143
9,280,833 B2 * 3/2016 Brown .................... G06T 7/246
(Continued)

FOREIGN PATENT DOCUMENTS

CN 103259962 A 8/2013
CN 106537184 A 3/2017
(Continued)

OTHER PUBLICATIONS

Jiang et al., Vehicle Tracking with Non-overlapping Views for Multi-camera Surveillance System 2013 IEEE 978-0-7695-5088-6/13, DOI 10.1109/HPCC. and EUC.2013.172, pp. 1213-1220. (Year: 2013).*

(Continued)

*Primary Examiner* — Ishrat I Sherali
(74) *Attorney, Agent, or Firm* — J.C. Patents

(57) ABSTRACT

Embodiments of the present disclosure provide an object tracking method and an apparatus. The method includes: obtaining multiple frames of first images shot by a first camera apparatus and a first shooting moment of each frame of the first images, where the first images include a first object; obtaining multiple frames of second images shot by a second camera apparatus and a second shooting moment of each frame of the second images, where the second images include a second object; obtaining a distance between the first camera apparatus and the second camera apparatus; and judging whether the first object and the second object are the same object according to the multiple frames of the first images, the first shooting moment of each frame of the first images, the multiple frames of the second images, the second shooting moment of each frame of the second images and the distance.

17 Claims, 9 Drawing Sheets

(51) Int. Cl.
*G06V 10/42* (2022.01)
*G06V 10/56* (2022.01)
*G06V 20/40* (2022.01)
*G06V 20/62* (2022.01)

(52) U.S. Cl.
CPC .......... *G06V 20/46* (2022.01); *G06V 20/625* (2022.01); *G06V 2201/08* (2022.01)

(56) References Cited

U.S. PATENT DOCUMENTS

| | | | |
|---|---|---|---|
| 10,176,405 B1* | 1/2019 | Zhou | G06K 9/6218 |
| 10,579,880 B2* | 3/2020 | Khorsandi | G06K 9/6232 |
| 11,024,039 B2* | 6/2021 | Danielsson | G06K 9/6288 |
| 11,055,538 B2* | 7/2021 | Koperski | G06T 7/292 |
| 11,080,868 B2* | 8/2021 | Jeon | G06T 7/292 |
| 2013/0222177 A1 | 8/2013 | Kajiki | |
| 2013/0307979 A1 | 11/2013 | Chen | |
| 2016/0092736 A1* | 3/2016 | Mai | G06K 9/4604 382/103 |
| 2020/0184256 A1* | 6/2020 | Ye | G06K 9/6223 |

FOREIGN PATENT DOCUMENTS

| | | |
|---|---|---|
| CN | 106714112 A | 5/2017 |
| CN | 109522814 A | 3/2019 |
| CN | 110084157 A | 8/2019 |

OTHER PUBLICATIONS

Montcalm et al., Object Inter-camera Tracking with non-overlapping views: A new dynamic approach, 2010 IEEE 978-0-7695-4040-5/10, DOI.1109/CVR.2010.53, pp. 354-361. (Year: 2010).*
The first Office Action of CN201910959616.4.

* cited by examiner

OBJECT TRACKING METHOD AND APPARATUS

CROSS-REFERENCE TO RELATED APPLICATION

This application claims priority to Chinese Patent Application No. 201910959616.4, filed on Oct. 10, 2019, which is hereby incorporated by reference in its entirety.

TECHNICAL FIELD

The present application relates to the field of image processing technology and, in particular, to an object tracking method and an apparatus.

BACKGROUND

As cities grow in size, the effective management of vehicles also becomes more urgent. In actual life, it is often needed to track vehicles in a driving state, and the vehicles are mainly tracked through multiple cameras in the urban road network. The cameras are disposed in different areas of the urban road network. When a vehicle passes the monitoring area of a camera, the general position of the vehicle can be known.

The existing method for tracking a vehicle mainly includes obtaining a surveillance video of a camera, and analyzing the moving trajectory of the target vehicle according to the target vehicle captured in the surveillance video of the camera to track the target. Because the vehicle is generally in the driving state, it is difficult for a single camera to effectively track the target vehicle, and the cooperation of multiple cameras is needed. When tracking a vehicle under different cameras, the existing solution uses a frame of image data under different cameras to judge whether the vehicles captured by different cameras are the same vehicle. When the similarity between the vehicles on the two frames of images reaches a certain degree, the vehicles on the two frames of images are considered to be the same vehicle, and the target vehicle is tracked using the judgment result.

The main problem of the existing solution is that using two frames of images to judge whether two vehicles are the same vehicle is greatly affected by the angle at which the image is shot; the posture and size of the captured vehicle have a greater effect on the result; and the tracking results based on only the image features are not accurate enough as well.

SUMMARY

Embodiments of the present disclosure provide an object tracking method and an apparatus, to solve the problem of the existing solution that using two frame of images are used to judge whether the two vehicles are the same vehicle is greatly affected by the angle at which the image is shot, and the tracking results based on only the image features are not accurate enough as well.

In a first aspect, an embodiment of the present disclosure provides an object tracking method, including:

obtaining multiple frames of first images shot by a first camera apparatus and a first shooting moment of each frame of the first images, where the first images include a first object;

obtaining multiple frames of second images shot by a second camera apparatus and a second shooting moment of each frame of the second images, where the second images include a second object;

obtaining a distance between the first camera apparatus and the second camera apparatus; and judging whether the first object and the second object are the same object according to the multiple frames of the first images, the first shooting moment of each frame of the first images, the multiple frames of the second images, the second shooting moment of each frame of the second images and the distance.

In a possible implementation, the first shooting moment is before the second shooting moment; the judging whether the first object and the second object are the same object according to the multiple frames of the first images, the first shooting moment of each frame of the first images, the multiple frames of the second images, the second shooting moment of each frame of the second images and the distance, includes:

determining a first similarity between the first object and the second object according to the multiple frames of the first images and the multiple frames of the second images;

determining a moving speed of the first object according to the first shooting moment of each frame of the first images;

determining a probability that the first object and the second object are the same object according to the moving speed of the first object, the distance, the first shooting moment and the second shooting moment; and judging whether the first object and the second object are the same object according to the first similarity and the probability.

In a possible implementation, the first similarity includes a global feature similarity and an attribute feature similarity; the determining a first similarity between the first object and the second object according to the multiple frames of the first images and the multiple frames of the second images include:

obtaining global features of the first object in the multiple frames of the first images and global features of the second object in the multiple frames of the second images according to a global feature model, where the global feature model is obtained by training according to multiple frames of first sample images;

obtaining the global feature similarity according to the global features of the first object and the global features of the second object;

obtaining attribute features of the first object in the multiple frames of the first images and attribute features of the second object in the multiple frames of the second images according to an attribute feature model, where the attribute feature model is obtained by training according to multiple frames of second sample images; and obtaining the attribute feature similarity according to the attribute features of the first object and the attribute features of the second object.

In a possible implementation, the obtaining the global feature similarity according to the global features of the first object and the global features of the second object includes:

obtaining a global feature similarity of each pair of images according to a global feature of the first object and a global feature of the second object in the each pair of images, where each pair of images include one frame of the first images and one frame of the second images; and performing mean value processing on global feature similarities of multiple pairs of images to obtain the global feature similarity.

In a possible implementation, the obtaining the attribute feature similarity according to the attribute features of the first object and the attribute features of the second object includes:

obtaining an attribute feature similarity of each pair of images according to an attribute feature of the first object and an attribute feature of the second object in the each pair of images, where each pair of images include one frame of the first images and one frame of the second images; and performing mean value processing on attribute feature similarities of multiple pairs of images to obtain the attribute feature similarity.

In a possible implementation, the first object is a first vehicle, and the second object is a second vehicle; the attribute feature includes a vehicle color feature, a vehicle type feature and a license plate feature; and the obtaining an attribute feature similarity of each pair of images according to the attribute feature of the first object and the attribute feature of the second object in the each pair of images includes:

obtaining a vehicle color feature similarity of each pair of images according to a vehicle color feature of the first vehicle and a vehicle color feature of the second vehicle in the each pair of images;

obtaining a vehicle type feature similarity of each pair of images according to a vehicle type feature of the first vehicle and a vehicle type feature of the second vehicle in the each pair of images;

obtaining a license plate feature similarity of each pair of images according to a license plate feature of the first vehicle and a license plate feature of the second vehicle in the each pair of images; and obtaining the attribute feature similarity of each pair of images according to the vehicle color feature similarity, the vehicle type feature similarity and the license plate feature similarity of the each pair of images.

In a possible implementation, the judging whether the first object and the second object are the same object according to the first similarity and the probability includes:

obtaining a first weight corresponding to the global feature similarity, a second weight corresponding to the attribute feature similarity, and a third weight corresponding to the probability;

fusing the global feature similarity, the attribute feature similarity and the probability according to the first weight, the second weight and the third weight to obtain a fusion parameter; and determining that the first object and the second object are the same object when the fusion parameter exceeds a preset value.

In a second aspect, an embodiment of the present disclosure provides an object tracking apparatus, including:

a first obtaining module, configured to obtain multiple frames of first images shot by a first camera apparatus and a first shooting moment of each frame of the first images, where the first images include a first object;

a second obtaining module, configured to obtain multiple frames of second images shot by a second camera apparatus and a second shooting moment of each frame of the second images, where the second images include a second object;

a third obtaining module, configured to obtain a distance between the first camera apparatus and the second camera apparatus; and a processing module, configured to judge whether the first object and the second object are the same object according to the multiple frames of the first images, the first shooting moment of each frame of the first images, the multiple frames of the second images, the second shooting moment of each frame of the second images and the distance.

In a possible implementation, the first shooting moment is before the second shooting moment; the processing module is specifically configured to:

determine a first similarity between the first object and the second object according to the multiple frames of the first images and the multiple frames of the second images;

determine a moving speed of the first object according to the first shooting moment of each frame of the first images;

determine a probability that the first object and the second object are the same object according to the moving speed of the first object, the distance, the first shooting moment and the second shooting moment; and judge whether the first object and the second object are the same object according to the first similarity and the probability.

In a possible implementation, the first similarity includes a global feature similarity and an attribute feature similarity; the processing module is specifically configured to:

obtain global features of the first object in the first images and global features of the second object in the second images according to a global feature model, where the global feature model is obtained by training according to multiple frames of first sample images;

obtain the global feature similarity according to the global features of the first object and the global features of the second object;

obtain attribute features of the first object in the first images and attribute features of the second object in the second images according to an attribute feature model, where the attribute feature model is obtained by training according to multiple frames of second sample images; and obtain the attribute feature similarity according to the attribute features of the first object and the attribute features of the second object.

In a possible implementation, the processing module is specifically configured to:

obtain a global feature similarity of each pair of images according to a global feature of the first object and a global feature of the second object in the each pair of images, where each pair of images include one frame of the first images and one frame of the second images; and perform mean value processing on global feature similarities of multiple pairs of images to obtain the global feature similarity.

In a possible implementation, the processing module is specifically configured to:

obtain an attribute feature similarity of each pair of images according to an attribute feature of the first object and an attribute feature of the second object in the each pair of images, where each pair of images include one frame of the first images and one frame of the second images; and perform mean value processing on attribute feature similarities of multiple pairs of images to obtain the attribute feature similarity.

In a possible implementation, the first object is a first vehicle, and the second object is a second vehicle; the attribute feature includes a vehicle color feature, a vehicle type feature and a license plate feature; and the processing module is specifically configured to:

obtain a vehicle color feature similarity of each pair of images according to a vehicle color feature of the first vehicle and a vehicle color feature of the second vehicle in the each pair of images;

obtain a vehicle type feature similarity of each pair of images according to a vehicle type feature of the first vehicle and a vehicle type feature of the second vehicle in the each pair of images;

obtain a license plate feature similarity of each pair of images according to a license plate feature of the first vehicle and a license plate feature of the second vehicle in the each pair of images; and obtain the attribute feature similarity of each pair of images according to the vehicle color feature similarity, the vehicle type feature similarity and the license plate feature similarity of the each pair of images.

In a possible implementation, the processing module is specifically configured to:

obtain a first weight corresponding to the global feature similarity, a second weight corresponding to the attribute feature similarity, and a third weight corresponding to the probability;

fuse the global feature similarity, the attribute feature similarity and the probability according to the first weight, the second weight and the third weight to obtain a fusion parameter; and determine that the first object and the second object are the same object when the fusion parameter exceeds a preset value.

In a third aspect, an embodiment of the present disclosure provides an electronic device, including:

at least one processor; and a memory connected, and in communication, with the at least one processor; where, the memory stores instructions executable by the at least one processor, and the instructions are executed by the at least one processor to enable the at least one processor to execute the object tracking method according to any one of the first aspect.

In a fourth aspect, an embodiment of the present disclosure provides a non-transitory computer-readable storage medium having computer instructions stored thereon, where the computer instructions are used to cause a computer to execute the object tracking method according to any one of the first aspect.

In the object tracking method and apparatus provided in the embodiments of the present disclosure, firstly, multiple frames of first images shot by the first camera apparatus and the first shooting moment of each frame of the first images are obtained, where the first images include the first object; multiple frames of the second images shot by the second camera apparatus and the second shooting moment of each frame of the second images are obtained, where the second images include the second object; then, the distance between the first camera apparatus and the second camera apparatus is obtained; finally, it is judged whether the first object and the second object are the same object according to the multiple frames of the first images, the first shooting moment of each frame of the first images, the multiple frames of the second images, the second shooting moment of each frame of the second images and the distance. In the solutions provided by the embodiments of the present disclosure, the object is tracked from two aspects. One aspect is to make judgment of matching using multiple frames of images that are shot, and the other aspect is to utilize the distance between two camera apparatus to assist in judgment. Moreover, each of the first camera apparatus and the second apparatus collect multiple frames of images. Therefore, the solutions provided by the embodiments of the present disclosure can reduce the impact of the image shooting angle and the object posture on the tracking result. Meanwhile, the moving speed of the object can be estimated through the multiple frames of the first images or the multiple frames of the second images, and the distance between the two camera apparatuses can be used to assist in the judgment, which improves the accuracy of the judgment. The tracking solutions have a better robustness, and the tracking results are more accurate.

Other effects of the foregoing optional implementations will be described below with reference to specific embodiments.

BRIEF DESCRIPTION OF DRAWINGS

In order to more clearly explain the technical solutions of embodiments of the present disclosure or in the prior art, the drawings that need to be used in the description of the embodiments or the prior art will be briefly introduced below. Obviously, the drawings in the following description are some embodiments of the present disclosure. For those skilled in the art, other drawings can be obtained based on these drawings without any creative effort.

DESCRIPTION OF EMBODIMENTS

Exemplary embodiments of the present application are described below with reference to the accompanying drawings, and include various details of the embodiments of the present application to facilitate understanding, which should be considered as merely exemplary. Therefore, those skilled in the art should recognize that various changes and modifications can be made to the embodiments described herein without departing from the scope and spirit of the present application. Also, for clarity and conciseness, descriptions of well-known functions and structures are omitted in the following description.

Figure 1:
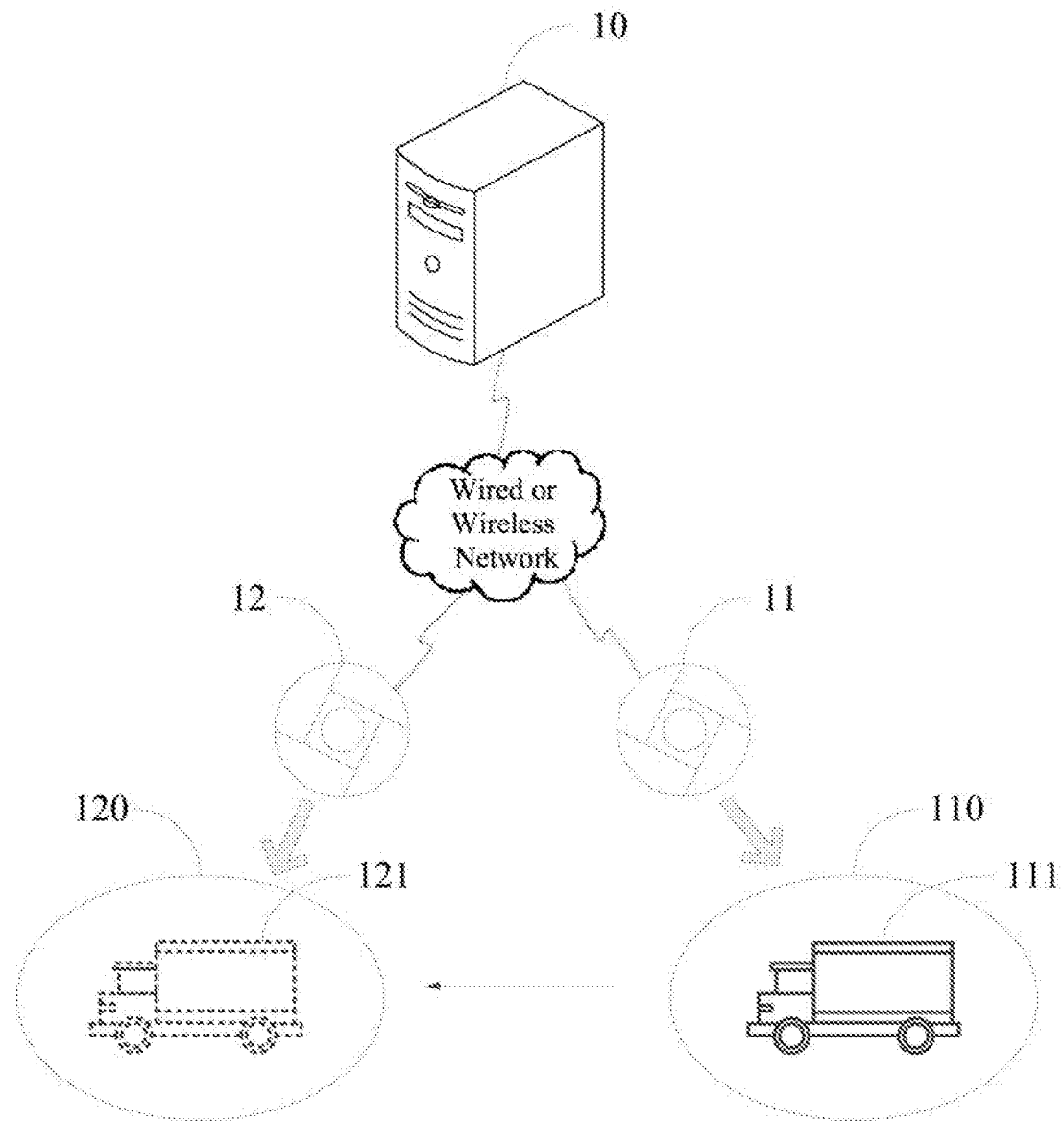
FIG. 1 is a schematic diagram of an application scenario of an object tracking method according to an embodiment of the present disclosure.

FIG. 1 is a schematic diagram of an application scenario of an object tracking method according to an embodiment of the present disclosure. As shown in FIG. 1, a server 10, a first camera apparatus 11 and a second camera apparatus 12 are included. The server 10 and the first camera apparatus 11 are connected through a wired or wireless network, and the server 10 and the second camera apparatus 12 are also connected through the wired or wireless network.

The first camera apparatus 11 is configured to send multiple frames of first images to the server 10, and the second camera apparatus 12 is configured to send multiple frames of second images to the server 10. The multiple frames of the first images may be multiple frames of images shot by the first camera apparatus 11, or may be a video shot by the first camera apparatus 11, which is then converted into multiple frames of the first images by the server 10. Similarly, the multiple frames of the second images may be multiple frames of images shot by the second camera apparatus 12, or may be a video shot by the second camera apparatus 12, which is then converted into multiple frames of the second images by the server 10.

Since more than two camera apparatuses may be included in an actual scene, the number of the camera apparatuses in the above scenario is not limited to two, which is merely an example for description. It can be judged whether the first object in the first images and the second object in the second images are the same object according to the multiple frames of the first images shot by the first camera apparatus 11 and the multiple frames of the second images shot by the second camera apparatus 12. If yes, it can be judged that after passing the monitoring area of the first camera apparatus 11, the object also passes the monitoring area of the second camera apparatus 12, so that the object tracking under different camera apparatuses is achieved. The first camera apparatus 11 and the second camera apparatus 12 may be any two of multiple camera apparatuses.

The monitoring range of the first camera apparatus 11 is for example the first monitoring range 110 in FIG. 1, and the monitoring range of the second camera apparatus 12 is for example the second monitoring range 120 in FIG. 1. Taking a truck in FIG. 1 as an example of the object, a first truck 111 is detected within the first monitoring range 110, and the first truck 111 needs to be tracked. A second truck 121 is detected within the second monitoring range 120 of the second camera apparatus 12. Therefore, it is needed to judge whether the first truck 111 and the second truck 121 are the same vehicle according to the first images shot by the first camera apparatus 11 and the second images shot by the second camera apparatus 12.

If the first truck 111 and the second truck 121 are not the same vehicle, an image shot by another camera apparatus is selected to judge whether a vehicle therein and the first truck 111 are the same vehicle until the next camera apparatus position where the first truck 111 appears is found. If the first truck 111 and the second truck 121 are the same vehicle, the tracking from the monitoring range of the first camera apparatus 11 to the monitoring range of the second camera 12 is achieved. Next, the second camera apparatus 12 is used as a starting point to continue the tracking under the next camera apparatus, so that the cross-camera object tracking can be achieved according to the images of each camera apparatus. Further, the trajectories of the vehicle from multiple camera apparatuses can be connected to observe the moving track of the object on the map.

The technical solutions of the present disclosure and how the technical solutions of the present application solve the above technical problems are described in detail in specific embodiments. The following specific embodiments may be combined with each other, and the same or similar concepts or processes may not be repeated in some embodiments. The embodiments of the present disclosure will be described below with reference to the drawings.

Figure 2:
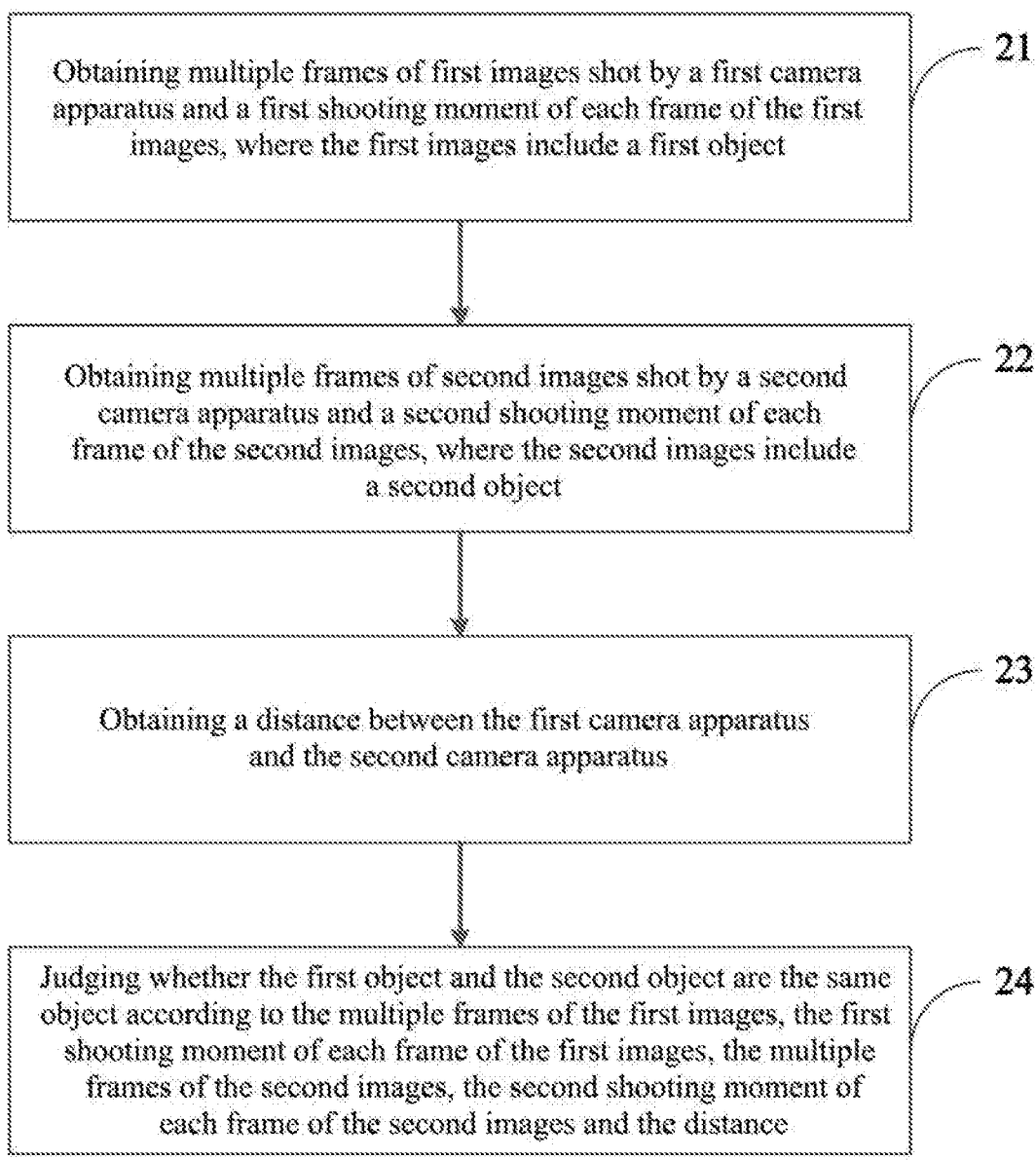
FIG. 2 is a schematic flowchart of an object tracking method according to an embodiment of the present disclosure.

FIG. 2 is a schematic flowchart of an object tracking method according to an embodiment of the present disclosure. As shown in FIG. 2, the method includes:

step 21: obtaining multiple frames of first images shot by a first camera apparatus and a first shooting moment of each frame of the first images, where the first images include a first object;

step 22: obtaining multiple frames of second images shot by a second camera apparatus and a second shooting moment of each frame of the second images, where the second images include a second object.

The object to be tracked in the embodiments of the present disclosure is generally a movable object. For example, the object may include a moving person, a moving vehicle, and the like, where the moving vehicle may also include different types of vehicles such as a car, a truck, and a lorry.

Camera apparatuses are disposed in areas where the object passes, and the positions and density of the camera apparatuses can be changed accordingly in different areas. Because the object is moving, the object may enter the monitoring area of another camera apparatus after passing through the monitoring area of one camera apparatus. Therefore, in order to achieve object tracking, it is necessary to judge whether the objects in the images shot by different camera apparatuses are the same object.

In the embodiment of the present disclosure, firstly, the multiple frames of the first images shot by the first camera apparatus and the first shooting moment of each frame of the first images are obtained, where the multiple frames of the first images may be directly shot by the first camera apparatus, or the first camera apparatus may shoot a surveillance video, and then convert the surveillance video into the multiple frames of the first images.

Each frame of the first images has a corresponding first shooting moment. The first shooting moment may be directly displayed on the first image, or may be obtained by a server as attribute information of the first image. Further, each frame of the first images includes a first object. If the first camera apparatus shoots multiple frames of images, only the first images including the first object are selected for processing, and the images which do not include the first object may be discarded.

The obtaining of the second images and the second shooting moment of each frame of the second images is similar to the obtaining of the first images and the first shooting moment of each of the first images, and details will not be repeated here.

Step 23: obtaining a distance between the first camera apparatus and the second camera apparatus.

There may be various methods for obtaining the distance between the first camera apparatus and the second camera apparatus. For example, a positioning apparatus may be installed on each of the first camera apparatus and the second camera apparatus, and the positioning apparatuses report the positions of the first camera apparatus and the second camera apparatus to the server, so that the distance between the first camera apparatus and the second camera apparatus is calculated according to the position of the first camera apparatus and the position of the second camera apparatus;

for another example, the user may know the installation positions of the first camera apparatus and the second camera apparatus in advance, and then mark the positions of the first camera apparatus and the second camera apparatus on an electronic map, so that the distance between the first camera apparatus and the second camera apparatus is obtained according to the scale of the electronic map and the user's marks, and so on. The above manners are just a few examples of obtaining the distance between the first camera apparatus and the second camera apparatus. The actual obtaining manners are not limited to the above manners, and are not particularly limited here.

Figure 3:
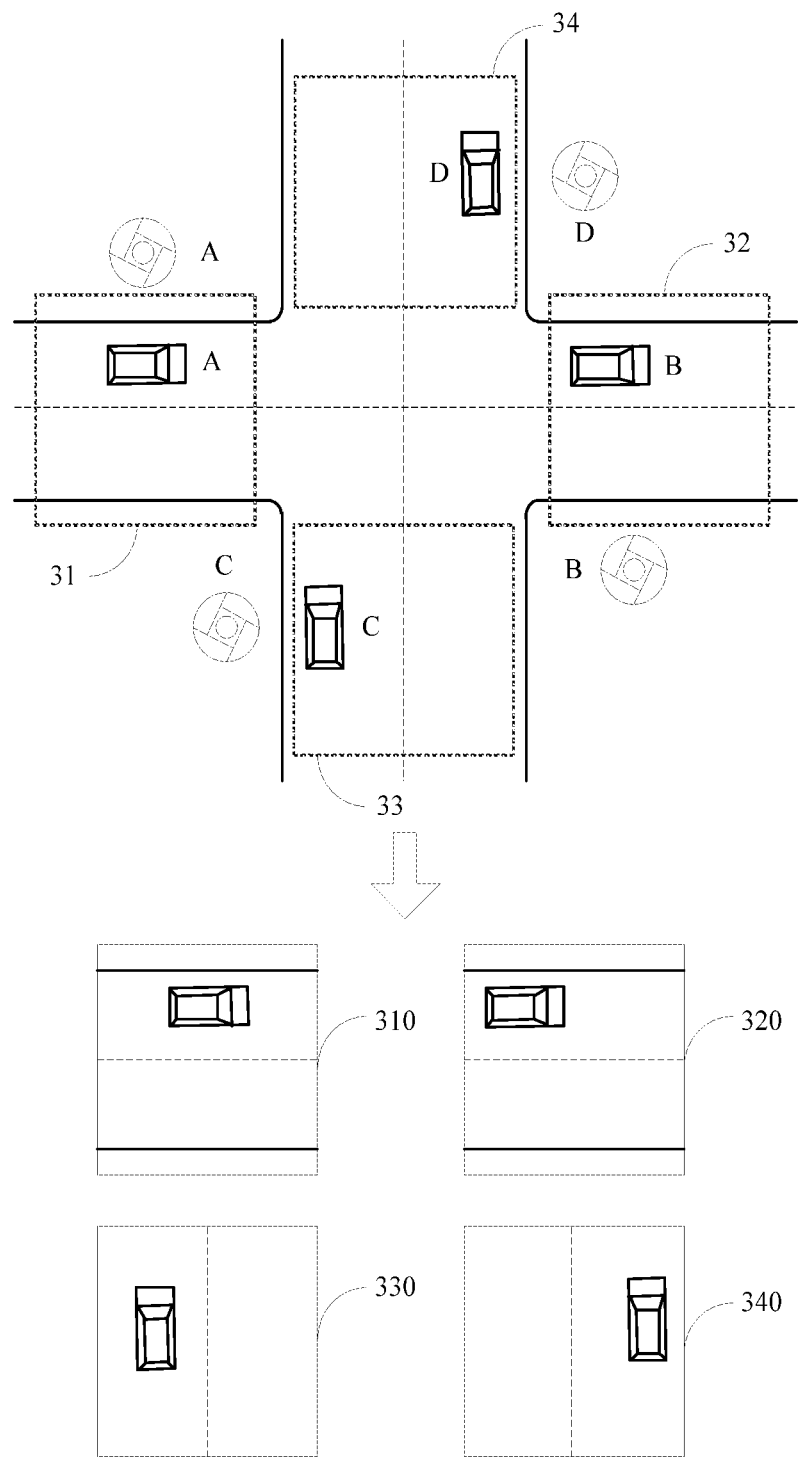
FIG. 3 is a schematic diagram of installation of a camera apparatus according to an embodiment of the present disclosure.

FIG. 3 is a schematic diagram of installation of a camera apparatus according to an embodiment of the present disclosure. As shown in FIG. 3, taking vehicles as examples of the first object and the second object, FIG. 3 includes multiple camera apparatus, which are respectively installed at points A, B, C, and D in FIG. 3; the monitoring range of the camera apparatus at point A is the first range 31, the monitoring range of the camera apparatus at point B is the second range 32, the monitoring range of the camera apparatus at point C is the third range 33, and the monitoring range of the camera apparatus at point D is the fourth range 34.

If the camera apparatus at point A is the first camera apparatus and the camera apparatus at point B is the second camera apparatus, then an image 310 shot by the camera apparatus A is the first image, and a vehicle A is the first object; an image 320 shot by the camera apparatus B is the second image, and a vehicle B is the second object; and the distance between the first camera apparatus and the second camera apparatus is the distance from point A to point B. Similarly, if the camera apparatus at point C is the first camera apparatus and the camera apparatus at point D is the second camera apparatus, then an image 330 shot by the camera apparatus C is the first image, and a vehicle C is the first object; an image 340 shot by the camera apparatus D is the second image, and a vehicle D is the second object; and the distance between the first camera apparatus and the second camera apparatus is the distance from point C to point D, and so on.

Step 24: judging whether the first object and the second object are the same object according to the multiple frames of the first images, the first shooting moment of each frame of the first images, the multiple frames of the second images, the second shooting moment of each frame of the second images and the distance.

After obtaining the multiple frames of the first images and the multiple frames of the second images, it can be judged from at least two aspects whether the first object and the second object are the same object. In the first aspect, an image feature of the first object and an image feature of the second object can be obtained through the first images and the second images, and the image feature of the first object and the image feature of the second object can be compared to obtain the matching similarity, where the image feature may include one or more types, such as a global feature, a local feature, and an attribute feature of the object. As shown in FIG. 3, the judgment can be made by extracting image features of different vehicles.

In addition to the first aspect, in the second aspect, the judgment is made according to the distance between different camera apparatuses, the first shooting moment and the second shooting moment. Since the object is moving, the moving speed of the first object can be roughly estimated based on the multiple frames of the first images and the first shooting moment of each frame of the first images, and the moving speed of the second object can be also roughly estimated based on the multiple frames of the second images and the second shooting moment of each frame of the second images. Then the time required for the object to move from one of the camera apparatuses to another is judged according to the moving speed of the object and the distance between the first camera apparatus and the second camera apparatus, and a difference between the first shooting moment and the second shooting moment is obtained. The required time is compared with the difference between the two shooting moments, to obtain the probability that the first object and the second object are the same object. Finally, the two aspects of information are integrated to comprehensively judge whether the first object and the second object are the same object.

In the object tracking method provided in the embodiment of the present disclosure, firstly, the multiple frames of the first images shot by the first camera apparatus and the first shooting moment of each frame of the first images are obtained, where the first images include the first object; the multiple frames of the second images shot by the second camera apparatus and the second shooting moment of each frame of the second images are obtained, where the second images include the second object; then, the distance between the first camera apparatus and the second camera apparatus is obtained; finally, it is judged whether the first object and the second object are the same object according to the multiple frames of the first images, the first shooting moment of each frame of the first images, the multiple frames of the second images, the second shooting moment of each frame of the second images and the distance. In the solution provided by the embodiment of the present disclosure, the object is tracked from two aspects. One aspect is to make judgment of matching using multiple frames of images that are shot, and the other aspect is to utilize the distance between two camera apparatus to assist in judgment. Moreover, each of the first camera apparatus and the second apparatus collect multiple frames of images. Therefore, the solution provided by the embodiment of the present disclosure can reduce the impact of the image shooting angle and the object posture on the tracking result. Meanwhile, the moving speed of the object can be estimated through the multiple frames of the first images or the multiple frames of the second images, and the distance between the two camera apparatuses can be used to assist in the judgment, which improves the accuracy of the judgment. The tracking solution has a better robustness.

Figure 4:
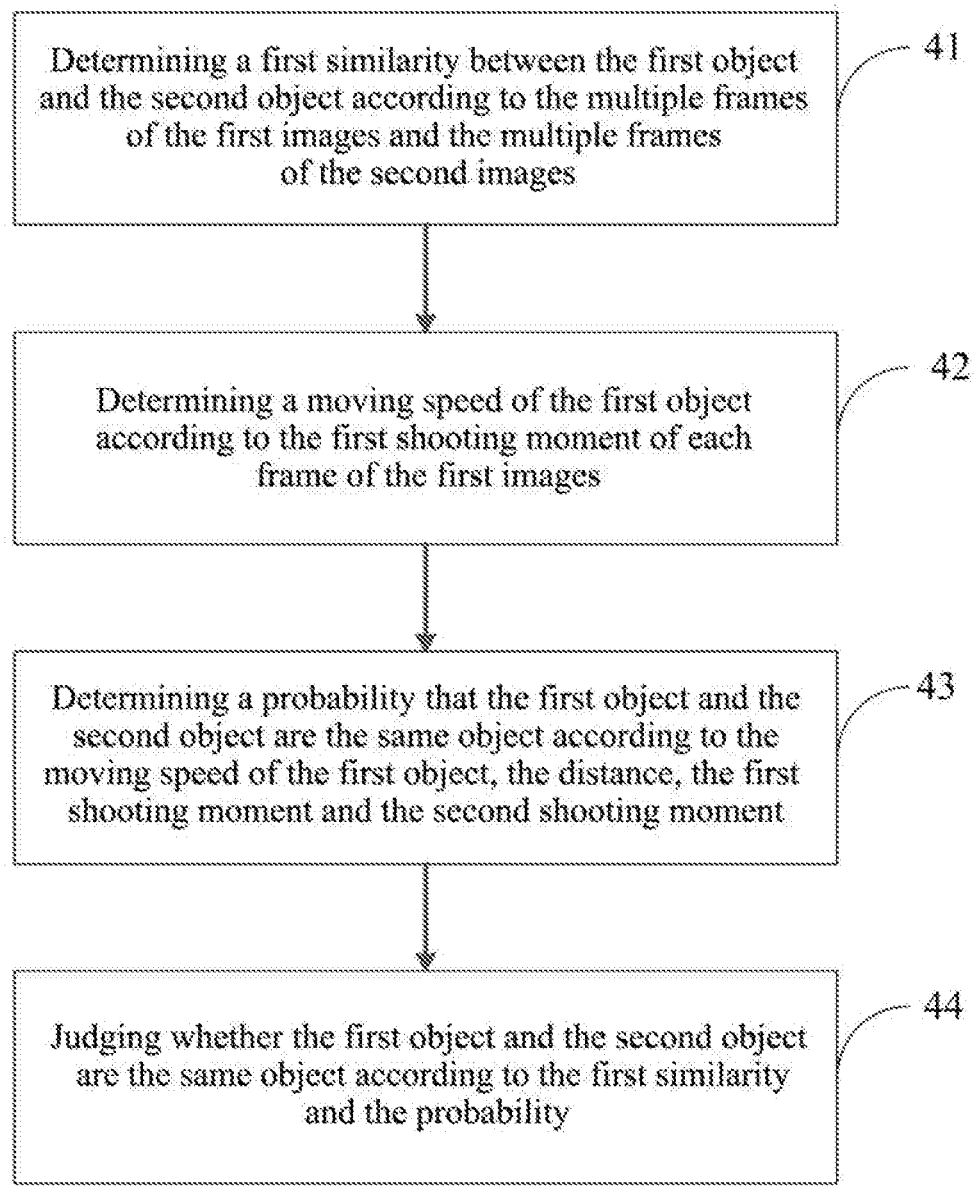
FIG. 4 is a schematic flowchart of judging whether a first object and a second object are the same object according to an embodiment of the present disclosure.

The following describes the solutions of the embodiments of the present disclosure in detail with reference to FIG. 4 and using specific embodiments. FIG. 4 is a schematic flowchart of judging whether a first object and a second object are the same object according to an embodiment of the present disclosure, where the first shooting moment is before the second shooting moment. As shown in FIG. 4, the judging includes:

Step 41: determining a first similarity between the first object and the second object according to the multiple frames of the first images and the multiple frames of the second images.

In this step, the first similarity is mainly obtained according a feature of the first object obtained through the multiple frames of the first images, and a feature of the second object obtained through the second images. The features of the first object and the second object may include attribute features, global features and others of the objects. For example, if the object is a person, the feature of the object may be features such as the person's face, the person's height, body type, color of clothes, hairstyle, etc.; if the object is a vehicle, the feature of the object may be features such as the color of the vehicle, the type of the vehicle, etc.; if the object is of other kinds, the feature of the object can be determined according to actual needs.

Figure 5:
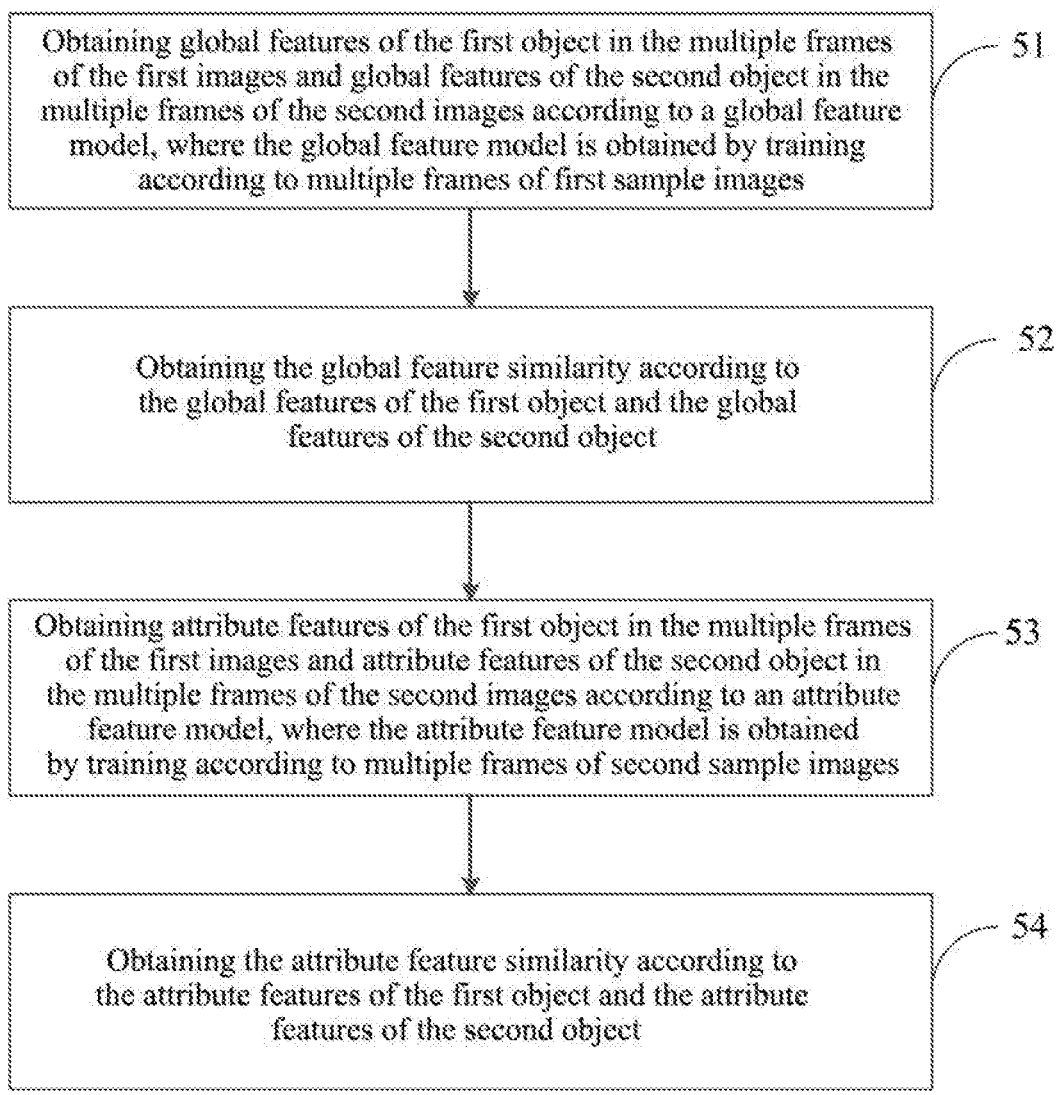
FIG. 5 is a schematic flowchart of determining a first similarity according to an embodiment of the present disclosure.

After obtaining the features of the first object and the second object, the first similarity between the first object and the second object can be obtained. For example, the first similarity can be obtained by comparing a first model and a second model which are obtained by modelling according to the first object and the second object respectively. In addition to the above method, the first similarity can also be determined by the following method. A process of obtaining a first similarity will be described below with reference to FIG. 5. FIG. 5 is a schematic flowchart of determining a first similarity according to an embodiment of the present disclosure. The first similarity includes a global feature similarity and an attribute feature similarity. As shown in FIG. 5, the determining a first similarity includes:

Step 51: obtaining global features of the first object in the multiple frames of the first images and global features of the second object in the multiple frames of the second images according to a global feature model, where the global feature model is obtained by training according to multiple frames of first sample images.

The global feature model is trained at first before performing global feature extraction on the first object. During the training, multiple frames of first sample images need to be obtained, where each frame of the first sample images includes an object. A unique identifier will be assigned to each object. For example, if the object is a vehicle in an example, an ID number can be assigned to each vehicle, and the corresponding vehicle can be uniquely determined according to the ID number.

For each frame of the first sample images, the background is removed to obtain a sample vehicle image. Then the sample vehicle image is input into the global feature model to obtain the global feature extracted by the global feature model. The global feature extracted by the global feature model is processed correspondingly to obtain the corresponding vehicle ID. Then the corresponding vehicle ID is compared with the sample vehicle ID, and the global feature model is trained according to the comparison result to obtain a trained global feature model.

Then the multiple frames of the first images are input into the trained global feature model to obtain the global features of the first object. When the first object is a first vehicle, global features of the first vehicle are obtained. Similarly, the multiple frames of the second images are input into the trained global feature model to obtain the global features of the second object. When the second object is a second vehicle, global features of the second vehicle are obtained.

Step 52: obtaining the global feature similarity according to the global features of the first object and the global features of the second object.

Since there are multiple frames of the first images, one global feature of the first object can be obtained from each frame of the first images, and similarly, one global feature of the second object can be obtained from each frame of the second images. Therefore, the global features of the first object and the global features of the second object will be combined in the embodiment of the present disclosure.

Specifically, a global feature similarity of each pair of images is obtained according to the global feature of the first object and the global feature of the second object in the each pair of images, where each pair of images include one frame of the first images and one frame of the second images. Then mean value processing is performed on the global feature similarities of multiple pairs of images to obtain the global feature similarity. This will be described below in combination with FIG. 6.

Figure 6:
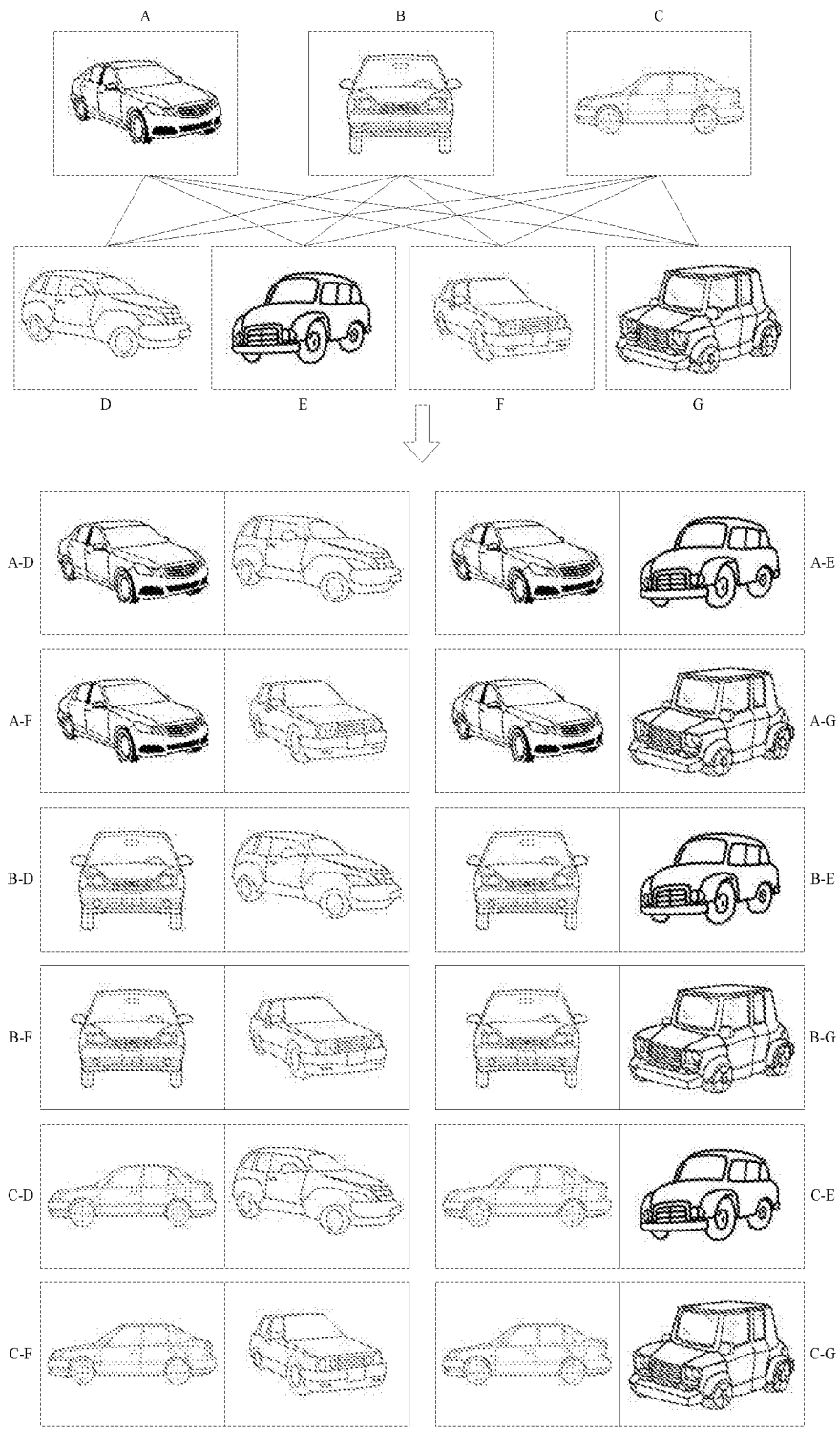
FIG. 6 is a schematic diagram of obtaining a global feature similarity according to an embodiment of the present disclosure.

FIG. 6 is a schematic diagram of obtaining a global feature similarity according to an embodiment of the present disclosure. As shown in FIG. 6, multiple frames of first images and multiple frames of second images are included. The first images include an image A, an image B and an image C, and the second images include an image D, an image E, an image F and an image G. Then the server will select any one first image and any one second image to obtain a pair of images, and compare the global features of the objects therein to obtain the global feature similarity of this pair of images.

The combination modes in FIG. 6 include: A-D, A-E, A-F, A-G, B-D, B-E, B-F, B-G, C-D, C-E, C-F, C-G, i.e., a total of 12 pairs of images, thereby a total of 12 global feature similarities, each for one pair of images, are obtained. Then the global feature similarity is obtained by averaging these 12 global feature similarities.

The number of frames of the first images and the number of frames of the second images in FIG. 6 are only examples, and the numbers are not limited thereto. For example, when there are10 frames of the first images and 20 frames of the second images, there are a total of 200 global feature similarities, which can be averaged to obtain the global feature similarity.

Step 53: obtaining attribute features of the first object in the multiple frames of the first images and attribute features of the second object in the multiple frames of the second images according to an attribute feature model, where the attribute feature model is obtained by training according to multiple frames of second sample images.

There may be multiple attribute features of an object, such as color, shape, etc. Therefore, when extracting attribute features, it is needed to train different attribute feature models for different attribute features.

Taking a vehicle as an example of the object, when the first object is the first vehicle and the second object is the second vehicle, the attribute feature of the vehicle includes multiple types of attribute features, such as a vehicle color feature, a vehicle type features and a license plate feature. In the embodiment of the present disclosure, the attribute features of the first vehicle and the second vehicle are recognized through a deep neural network model. For each vehicle attribute, a corresponding attribute feature model needs to be trained. For example, for the vehicle color, firstly multiple frames of second sample images are obtained, where each frame of the second sample images includes a sample vehicle, and the vehicle colors of the sample vehicles in the multiple frames of the second sample images are not exactly the same.

A unique identifier will be assigned to each vehicle. For example, an ID number can be assigned to each vehicle, and the corresponding vehicle can be uniquely determined based on the ID number. Further, when training an attribute feature model corresponding to the vehicle color, for each frame of the second sample images, the background is removed to obtain a second vehicle image. Then the second vehicle image is input into the attribute feature model corresponding to the vehicle color to obtain the vehicle color feature extracted by the feature model corresponding to the vehicle color. The vehicle color feature extracted by the feature model corresponding to the vehicle color is processed correspondingly to obtain the corresponding vehicle ID. Then the corresponding vehicle ID is compared with the sample vehicle ID, and the feature model corresponding to the vehicle color is trained according to the comparison result to obtain a trained feature model corresponding to the vehicle color.

The training process of the attribute feature model for each vehicle attribute is similar to the training process of the attribute feature model corresponding to the vehicle color, and will not be repeated here. It can be understood that the first sample images and the second sample images may be the same sample images or different sample images, and the sample images used for training different attribute features may be the same sample images or different sample images.

Step 54: obtaining the attribute feature similarity according to the attribute features of the first object and the attribute features of the second object.

Firstly, an attribute feature similarity of each pair of images is obtained according to the attribute feature of the first object and the attribute feature of the second object in the each pair of images, where each pair of images include one frame of the first images and one frame of the second images. When the first object is the first vehicle and the second object is the second vehicle, the attribute feature includes the vehicle color feature, the vehicle type features and the license plate feature. The obtaining the attribute feature similarity specifically includes:

obtaining a vehicle color feature similarity of each pair of images according to the vehicle color feature of the first vehicle and the vehicle color feature of the second vehicle in the each pair of images.

For the vehicle color feature, a vehicle color of the first vehicle in each frame of the first images and a corresponding confidence level as well as a vehicle color of the second vehicle in each frame of the second images and a corresponding confidence level are obtained through the attribute feature model corresponding to the vehicle color feature. The confidence level represents the reliability of vehicle color recognition and is a value between 0 and 1 (i.e., 0-1) to reflect the accuracy of vehicle color recognition. Then the vehicle color features of the first vehicle, each of which has a confidence level greater than a preset threshold, are averaged as the vehicle color of the first vehicle in the multiple frames of first images. For example, there are 10 frames of the first images in total, where eight frames are red and each of them has the confidence level of 0.8, and two frames are black and each of them has the confidence level of 0.2. A vector is formed according to predefined color types. For example, 12 colors are predefined, then the position of red is 0.8, the position of black is 0.2 and the positions of others are 0 on the corresponding color vector. The same method can be used to obtain the vehicle color of the second vehicle in the multiple frames of the second images, and the same vector can also be constructed.

Obtaining a vehicle type feature similarity of each pair of images according to a vehicle type feature of the first vehicle and a vehicle type feature of the second vehicle in the each pair of images.

For the vehicle type in a sequence of images, such as multiple frames of the first images, a vehicle type feature of the first vehicle is extracted from each frame of the first images using the attribute feature type corresponding to the vehicle type feature. Similarly, the vehicle type feature of the second vehicle is extracted from each frame of the second images. Then the multiple frames of the first images and the multiple frames of the second images are combined in pairs to obtain multiple pairs of images, where each pair of images include one frame of the first images and one frame of the second images.

Obtaining a license plate feature similarity of each pair of images according to a license plate feature of the first vehicle and a license plate feature of the second vehicle in the each pair of images.

For the license plate feature, since not all of the first images or not all of the second images can capture the license plate feature of the vehicle, for each pair of images, if the license plate feature cannot be extracted from at least one frame of a pair of images, the license plate similarity between the pair of images is 0. When the license plate features can be extracted from both frames of the pair of images, the similarity between the license plate features in the first image and the second image is calculated.

Obtaining the attribute feature similarity of each pair of images according to the vehicle color feature similarity, the vehicle type feature similarity and the license plate feature similarity of the each pair of images, where the attribute feature similarity of each pair of images includes the vehicle color feature similarity, the vehicle type feature similarity and the license plate feature similarity of the each pair of images.

Finally, performing mean value processing on the attribute feature similarities of multiple pairs of images to obtain the attribute feature similarity.

Specifically, the distance between the vehicle color feature vector corresponding to the first vehicle and the vehicle color feature vector corresponding to the second vehicle is calculated to obtain the vehicle color feature similarity Pc. For each pair of images, the vehicle type feature similarity between the vehicle type feature of the first vehicle and the vehicle type feature of the second vehicle is calculated, and the vehicle type feature similarities of multiple pairs of images are averaged to obtain the vehicle type feature similarity, denoted as Pt. The license plate feature similarities of multiple pairs of images are averaged to obtain the license plate feature similarity, denoted as Pp. The attribute feature similarity includes the vehicle color feature similarity Pc, the vehicle type feature similarity Pt and the license plate feature similarity Pp.

Step 42: determining a moving speed of the first object according to the first shooting moment of each frame of the first images.

The above steps describe the extraction of the global features and the attribute features, and the global feature similarity and the attribute feature similarity of the first object and the second object in the first images and the second images are calculated. Further, in the embodiments of the present disclosure, the time dimension is also considered in addition to the consideration of the global features and the attribute features.

Specifically, the object will have a certain speed during the movement, so the moving speed of the first object can be obtained, and then the approximate time for the first object to reach the second camera apparatus is estimated in combination with the distance between the first camera apparatus and the second camera apparatus. Finally, the second shooting moment when the second camera apparatus shoots the second image is used for judgment to see if the difference between the first shooting moment and the second shooting moment is close to the approximate time for the first object to reach the second camera apparatus. If yes, the probability that the first object and the second object are the same object is larger, and if no, the probability is smaller.

Figure 7:
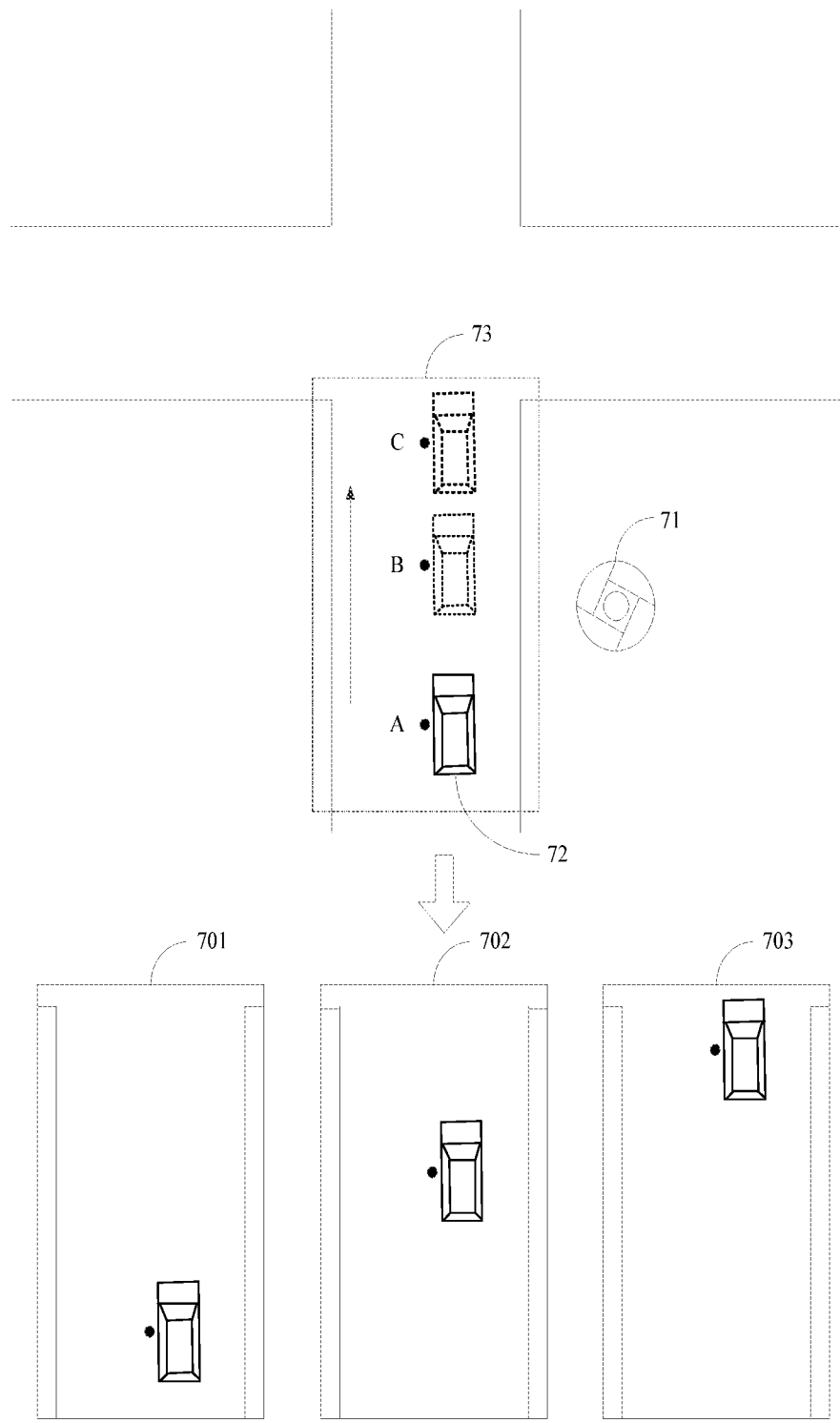
FIG. 7 is a schematic diagram of obtaining a moving speed of a first object according to an embodiment of the present disclosure.

This will be specifically described below in combination with FIG. 7. FIG. 7 is a schematic diagram of obtaining a moving speed of a first object according to an embodiment of the present disclosure. As shown in FIG. 7, the first vehicle is taken as an example of the first object. A first camera apparatus 71 and a first vehicle 72 are included, and the dotted line in the figure shows a first monitoring range 73 of the first camera apparatus 71, which is passed by the first vehicle 72.

When the first vehicle 72 travels on the road and passes the first monitoring range 73, the first camera apparatus 71 shoots first images and captures the first vehicle 72. There are multiple frames of the first images, such as a first frame image 701, a second frame image 702 and a third frame image 703 in FIG. 7. The first vehicle 72 passes a point A when the first frame image 701 is shot; the first vehicle 72 passes a point B when the second frame image 702 is shot; and the first vehicle 72 passes a point C when the third frame image 703 is shot. The points A and C can be boundary points of the first monitoring range 73, or can be points within the first monitoring range 73, and the point B is a point within the first monitoring range 73. The first shooting moments corresponding to the three frames of images are t1, t2 and t3 respectively.

According to parameters and the installation position of the first camera apparatus 71, the positions of the points A, B, and C can be obtained, so that the length of three line segments AB, BC and AC can be obtained. Therefore, the moving speed v of the first vehicle 72 can be obtained according to the above parameters, and there are various calculation manners, which will now be described as examples.

In the first manner, the shooting moment t1 at which the first frame image 701 of the first vehicle 72 is initially shot and the shooting moment t3 at which the third frame image 703 of the first vehicle 72 is finally shot can be directly obtained, and the distance Si between A and C is obtained simultaneously, so that the moving speed v of the first vehicle 72 in the segment between A and C is obtained as:

$$v = \frac{S1}{t3-t1}.$$

In the second manner, a moving speed v1 of the first vehicle 72 between A and B and a moving speed v2 between B and C are obtained first, and then the average value is calculated as:

$$v = \frac{v1+v2}{2},$$

where $$v1 = \frac{S2}{t2-t1}, v2 = \frac{S3}{t3-t2},$$

S2 is the distance between A and B, and S3 is the distance between A and C.

It can be understood that the above calculation manners of the moving speed of the first object and the three frames of images shot in FIG. 7 are only examples, and the actual calculation manner and the number of image frames are not limited thereto.

Step 43: determining a probability that the first object and the second object are the same object according to the moving speed of the first object, the distance, the first shooting moment and the second shooting moment.

Figure 8:
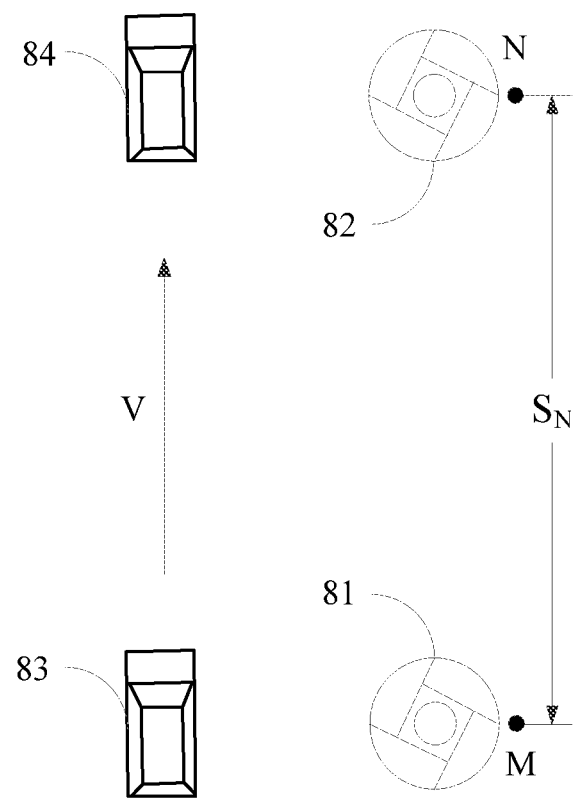
FIG. 8 is a schematic diagram of obtaining a time required for a first object to move to a second camera apparatus according to an embodiment of the present disclosure.

FIG. 8 is a schematic diagram of obtaining a time required for a first object to move to a second camera apparatus according to an embodiment of the present disclosure. As shown in FIG. 8, a first camera apparatus 81 and a second camera apparatus 82 are included. The first camera apparatus 81 is at a point M. The second camera apparatus 82 is at a point N. The distance between M and N is $S_N$, and the driving speed of a first vehicle 83 is V. Then the time T required for the first vehicle 83 to reach the second camera apparatus 82 is:

$$T = \frac{S_N}{V}.$$

Then, the first shooting moment T1 of any one first image shot by the first camera apparatus 81 is obtained, and the second shooting moment T2 of any one second image shot by the second camera apparatus 82 is obtained. It can be seen that if the first vehicle 83 and a second vehicle 84 are the same vehicle, the real time required for the first vehicle 83 to reach the second camera apparatus 82 is:

$$T_{real} = T2 - T1.$$

Then the probability Pv that the first vehicle 83 and the second vehicle 84 are the same vehicle is:

$$Pv = \begin{cases} \frac{|T - T_{real}|}{\max(T, T_{real})}, & |T - T_{real}| < \sigma \\ 0, & |T - T_{real}| \geq \sigma \end{cases},$$

where σ is the difference between the real time and the predicted time, which can be set according to actual needs.

Step 44: judging whether the first object and the second object are the same object according to the first similarity and the probability.

Specifically, a first weight corresponding to the global feature similarity, a second weight corresponding to the attribute feature similarity and a third weight corresponding to the probability are obtained.

Then the global feature similarity, the attribute feature similarity and the probability are fused according to the first weight, the second weight and the third weight to obtain a fusion parameter. The formula for calculating the fusion parameter is as follows:

$$f = \alpha * Pa + \beta * Pc + \gamma * Pt + \mu * Pp + \theta * Pv,$$

where f is the fusion parameter, α is the first weight, Pa is the global feature similarity, β is a weight corresponding to the vehicle color, Pc is the vehicle color feature similarity, γ is a weight corresponding to the vehicle type; Pt is the vehicle type feature similarity; μ is a weight corresponding to the license plate, Pp is the license plate feature similarity, the second weight includes β, γ and μ, the attribute feature similarity includes Pc, Pt and Pp, θ is the third weight, Pv is the probability that the first object and the second object are the same object.

It is determined that the first object and the second object are the same object when the fusion parameter exceeds a preset value.

The greater the fusion parameter f is, the more similar the first object and the second object are. When the fusion parameter f exceeds the preset threshold, it indicates that the first object and the second object are the same object; otherwise they are not the same object. Specifically, when the fusion parameter f exceeds the preset threshold, it indicates that the first vehicle and the second vehicle are the same vehicle; otherwise they are not the same vehicle.

In the object tracking method provided in the embodiments of the present disclosure, firstly, the multiple frames of the first images shot by the first camera apparatus and the first shooting moment of each frame of the first images are obtained, where the first images include the first object; the multiple frames of the second images shot by the second camera apparatus and the second shooting moment of each frame of the second images are obtained, where the second images include the second object; then, the distance between the first camera apparatus and the second camera apparatus is obtained; finally, it is judged whether the first object and the second object are the same object according to the multiple frames of the first images, the first shooting moment of each frame of the first images, the multiple frames of the second images, the second shooting moment of each frame of the second images and the distance. In the solutions provided by the embodiments of the present disclosure, the object is tracked from two aspects. One aspect is to make judgment of matching using multiple frames of images that are shot, and the other aspect is to utilize the distance between two camera apparatus to assist in judgment. Moreover, each of the first camera apparatus and the second apparatus collect multiple frames of images. Therefore, the solutions provided by the embodiments of the present disclosure can reduce the impact of the image shooting angle and the object posture on the tracking result. Meanwhile, the moving speed of the object can be estimated through the multiple frames of the first images or the multiple frames of the second images, and the distance between the two camera apparatuses can be used to assist in the judgment, which improves the accuracy of the judgment. The tracking solution has a better robustness, and the tracking results are more accurate.

Figure 9:
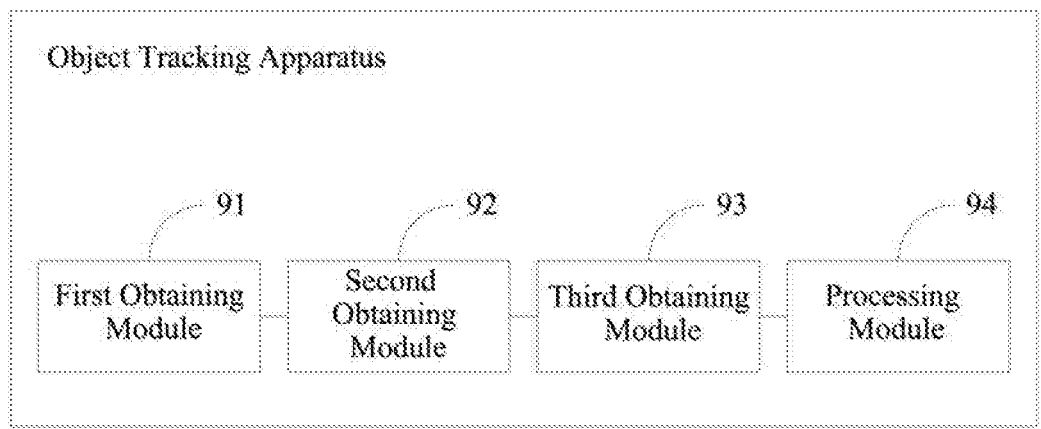
FIG. 9 is a schematic structural diagram of an object tracking apparatus according to an embodiment of the present disclosure.

FIG. 9 is a schematic structural diagram of an object tracking apparatus according to an embodiment of the present disclosure. As shown in FIG. 9, the apparatus includes a first obtaining module 91, a second obtaining module 92, a third obtaining module 93 and a processing module 94, where:

the first obtaining module 91 is configured to obtain multiple frames of first images shot by a first camera apparatus and a first shooting moment of each frame of the first images, where the first images include a first object;

the second obtaining module 92 is configured to obtain multiple frames of second images shot by a second camera apparatus and a second shooting moment of each frame of the second images, where the second images include a second object;

the third obtaining module 93 is configured to obtain a distance between the first camera apparatus and the second camera apparatus; and the processing module 94 is configured to judge whether the first object and the second object are the same object according to the multiple frames of the first images, the first shooting moment of each frame of the first images, the multiple frames of the second images, the second shooting moment of each frame of the second images and the distance.

In a possible implementation, the first shooting moment is before the second shooting moment; the processing module 94 is specifically configured to:

determine a first similarity between the first object and the second object according to the multiple frames of the first images and the multiple frames of the second images;

determine a moving speed of the first object according to the first shooting moment of each frame of the first images;

determine a probability that the first object and the second object are the same object according to the moving speed of the first object, the distance, the first shooting moment and the second shooting moment; and judge whether the first object and the second object are the same object according to the first similarity and the probability.

In a possible implementation, the first similarity includes a global feature similarity and an attribute feature similarity; the processing module 94 is specifically configured to:

obtain global features of the first object in the multiple frames of the first images and global features of the second object in the multiple frames of the second images according to a global feature model, where the global feature model is obtained by training according to multiple frames of first sample images;

obtain the global feature similarity according to the global features of the first object and the global features of the second object;

obtain attribute features of the first object in the multiple frames of the first images and attribute features of the second object in the multiple frames of the second images according to an attribute feature model, where the attribute feature model is obtained by training according to multiple frames of second sample images; and obtain the attribute feature similarity according to the attribute features of the first object and the attribute features of the second object.

In a possible implementation, the processing module 94 is specifically configured to:

obtain a global feature similarity of each pair of images according to a global feature of the first object and a global feature of the second object in the each pair of images, where each pair of images include one frame of the first images and one frame of the second images; and perform mean value processing on global feature similarities of multiple pairs of images to obtain the global feature similarity.

In a possible implementation, the processing module 94 is specifically configured to:

obtain an attribute feature similarity of each pair of images according to an attribute feature of the first object and an attribute feature of the second object in the each pair of images, where each pair of images include one frame of the first images and one frame of the second images; and perform mean value processing on attribute feature similarities of multiple pairs of images to obtain the attribute feature similarity.

In a possible implementation, the first object is a first vehicle, and the second object is a second vehicle; the attribute feature includes a vehicle color feature, a vehicle type feature and a license plate feature; and the processing module 94 is specifically configured to:

obtain a vehicle color feature similarity of each pair of images according to a vehicle color feature of the first vehicle and a vehicle color feature of the second vehicle in the each pair of images;

obtain a vehicle type feature similarity of each pair of images according to a vehicle type feature of the first vehicle and a vehicle type feature of the second vehicle in the each pair of images;

obtain a license plate feature similarity of each pair of images according to a license plate feature of the first vehicle and a license plate feature of the second vehicle in the each pair of images; and obtain the attribute feature similarity of each pair of images according to the vehicle color feature similarity, the vehicle type feature similarity and the license plate feature similarity of the each pair of images.

In a possible implementation, the processing module 94 is specifically configured to:

obtain a first weight corresponding to the global feature similarity, a second weight corresponding to the attribute feature similarity, and a third weight corresponding to the probability;

fuse the global feature similarity, the attribute feature similarity and the probability according to the first weight, the second weight and the third weight to obtain a fusion parameter; and determine that the first object and the second object are the same object when the fusion parameter exceeds a preset value.

The apparatus provided by the embodiment of the present disclosure can be used to execute the technical solutions of the foregoing method embodiments. The implementation principles and technical effects are similar, and will not be repeated here.

According to an embodiment of the present application, the present application also provides an electronic device and a readable storage medium.

Figure 10:
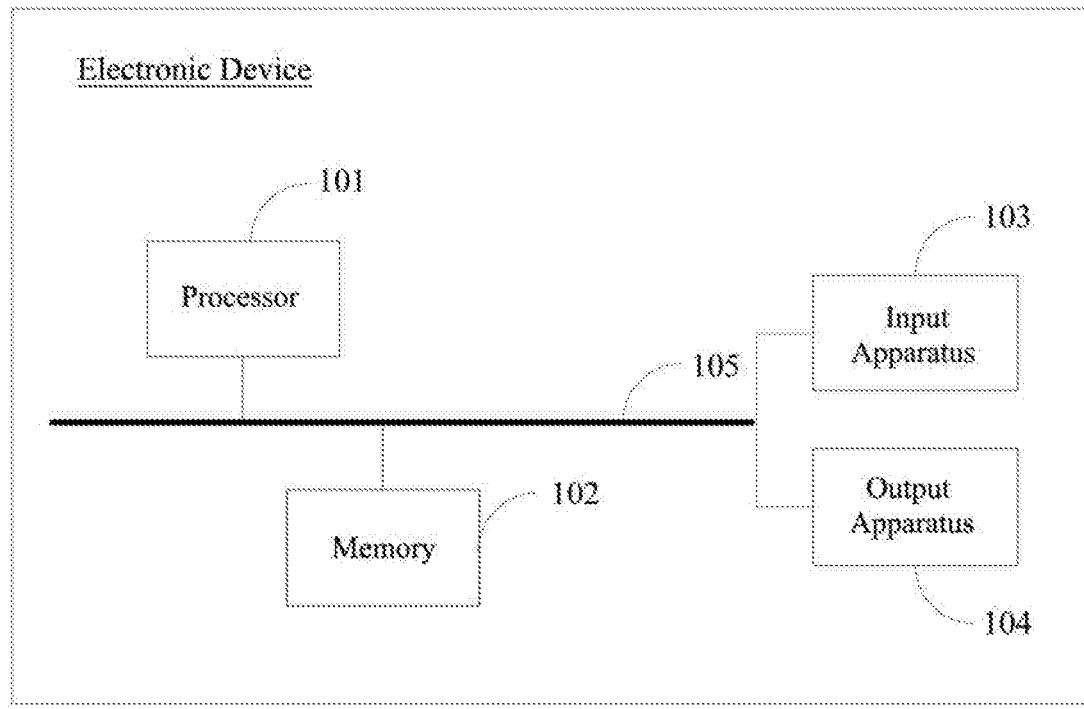
FIG. 10 is a block diagram of an electronic device for an object tracking method according to an embodiment of the present disclosure.

FIG. 10 is a block diagram of an electronic device for an object tracking method according to an embodiment of the present disclosure. As shown in FIG. 10, the electronic device is intended to represent various forms of digital computers, such as laptop computers, desktop computers, workbenches, personal digital assistants, servers, blade servers, mainframe computers, and other suitable computers. The electronic device can also represent various forms of mobile devices, such as personal digital assistants, cellular phones, smart phones, wearable devices, and other similar computing devices. The components shown herein, their connections and relationships, and their functions are merely examples, and are not intended to limit the implementation of the present application described and/or claimed herein.

As shown in FIG. 10, the electronic device includes: one or more processors 101, a memory 102, and interfaces for connecting various components, including high-speed interfaces and low-speed interfaces. The various components are connected to each other using different buses 105 and can be installed on a common motherboard or in other ways as needed. The processors 101 can process instructions executed within the electronic device, including instructions stored in or on the memory 102 ford is playing graphical information of the GUI on an external input/output apparatus such as a display device coupled to the interface. In other implementations, multiple processors 101 and/or multiple buses 105 can be used with multiple memories 102 if desired. Similarly, multiple electronic devices can be connected, and each device provides some necessary operations (for example, as a server array, a group of blade servers, or a multi-processor system). In FIG. 10, one processor 101 is taken as an example.

The memory 102 is a non-transitory computer-readable storage medium provided by the present application. The memory 102 stores instructions executable by at least one processor 101, so that the at least one processor 101 executes the object tracking method provided by the present application. The non-transitory computer-readable storage medium of the present application stores computer instructions for causing a computer to execute the object tracking method provided by the present application.

As a non-transitory computer-readable storage medium, the memory 102 can be used to store non-transitory software programs, non-transitory computer executable programs and modules, such as program instructions/modules corresponding to the object tracking methods in the embodiments of the present application (for example, the first obtaining module 91, the second obtaining module 92, the third obtaining module 93 and the processing module 94 shown in FIG. 9). The processor 101 executes various functional applications and data processing of a server by running non-transitory software programs, instructions and modules stored in the memory 102, that is, implementing the object tracking methods in the foregoing method embodiments.

The memory 102 may include a program storage area and a data storage area, where the program storage area may store an operating system and application programs required for at least one function, and the data storage area may store data and the like created according to the use of the electronic device for the object tracking method. In addition, the memory 102 may include a high-speed random access memory, and may also include a non-transitory memory, such as at least one magnetic disk storage device, a flash memory device, or other non-transitory solid-state storage devices. In some embodiments, the memory 102 may optionally include memories remotely provided with respect to the processor 101, and these remote memories may be connected to the electronic device for the object tracking method through a network. Examples of the above network include but are not limited to the Internet, intranet, local area network, mobile communication network, and combinations thereof The electronic device for the object tracking method may further include: an input apparatus 103 and an output apparatus 104. The processor 101, the memory 102, the input apparatus103 and the output apparatus104 may be connected through the bus 105 or in other means. In FIG. 10, the connection through the bus 105 is taken as an example.

The input apparatus 103 can receive input digital or character information, and generate key signal inputs related to user settings and function control of the electronic device for the object tracking method, such as a touch screen, a keypad, a mouse, a track pad, a touch pad, a pointing stick, one or more mouse buttons, a trackball, a joystick and other input apparatuses. The output apparatus 104 may include a display device, an auxiliary lighting apparatus (for example, a LED), a tactile feedback apparatus (for example, a vibration motor), and the like. The display device may include, but is not limited to, a liquid crystal display (LCD), a light emitting diode (LED) display, and a plasma display. In some implementations, the display device may be a touch screen.

Various implementations of the systems and techniques described herein may be implemented in digital electronic circuitry systems, integrated circuit systems, ASICs (application specific integrated circuits), computer hardware, firmware, software, and/or combinations thereof. These implementations may include the implementation in one or more computer programs that can be executed and/or interpreted on a programmable system that includes at least one programmable processor, and the programmable processor can be a dedicated or general-purpose programmable process. The programmable processor can receive data and instructions from the storage system, at least one input apparatus and at least one output apparatus, and transmit data and instructions to the storage system, the at least one input apparatus and the at least one output apparatus.

These computing programs (also called programs, software, software applications, or codes) include machine instructions of the programmable processor, and can be implemented using high-level process and/or object-oriented programming languages, and/or assembly/machine languages. As used herein, the terms "machine-readable medium" and "computer-readable medium" refer to any computer program product, device and/or apparatus for providing machine instructions and/or data to the programmable processor, e.g., a magnetic disk, an optical disk, a memory, a programmable logic device (PLD), and include the machine-readable medium that receives machine instructions as machine-readable signals. The term "machine-readable signal" refers to any signal for providing machine instructions and/or data to the programmable processor.

In order to provide interaction with the user, the systems and techniques described herein can be implemented on a computer with: a display apparatus(for example, a CRT (cathode ray tube) or LCD (liquid crystal display) monitor) for display information to the user; and a keyboard and pointing apparatus(for example, a mouse or a trackball), with which the user can provide inputs to the computer. Other kinds of apparatuses can also be used to provide interaction with users; for example, the feedback provided to the user may be any form of sensory feedback (e.g., visual feedback, auditory feedback, or tactile feedback); and the inputs from the user can be received in any form (including sound inputs, voice inputs, or tactile inputs).

The systems and techniques described herein can be implemented in a computing system that includes back-end components (e.g., as a data server), a computing system that includes middleware components (e.g., an application server), a computing system that includes front-end components (e.g., a user computer with a graphical user interface or a web browser, through which the user can interact with the implementation of the systems and techniques described herein), or a computing system that includes any combination of such back-end components, middleware components or front-end components. The components of the system can be interconnected by digital data communication (e.g., a communication network)of any form or medium. The examples of the communication network include: local area network (LAN), wide area network (WAN) and the Internet.

The computer system may include a client and a server. The client and the server are generally far from each other and usually interact through a communication network. The client-server relationship is generated by computer programs that run on corresponding computers and have a client-server relationship.

It should be understood that for the various forms of processes shown above, steps can be reordered, added or deleted. For example, the steps described in the present application may be performed in parallel, sequentially, or in different order, as long as the desired results of the technical solutions disclosed in the present application can be achieved, which is not limited herein.

The above specific implementations do not constitute a limitation on the protection scope of the present application. Those skilled in the art should understand that various modifications, combinations, sub-combinations and substitutions can be made according to design requirements and other factors. Any modification, equivalent replacement and improvement made within the spirit and principle of the present application shall fall within the protection scope of the present application.

What is claimed is:

1. An_object tracking method, comprising:
   obtaining multiple frames of first images_shot by a first camera apparatus and a first shooting moment of each frame of the first images, wherein the first images comprise a first object;
   obtaining multiple frames of second images_shot by a second camera apparatus and a second shooting moment of each frame of the second images, wherein the second images comprise a second object and the first shooting moment is before the second shooting moment;
   obtaining a distance between the first camera apparatus and the second camera apparatus; and
   determining a first similarity between the first object and the second object according to the multiple frames of the first images and the multiple frames of the second images;
   determining a moving speed of the first object according to the first shooting moment of each frame of the first images;
   determining a probability that the first object and the second object are the same object according to the moving speed of the first object, the distance, the first shooting moment and the second shooting moment; and
   judging whether the first object and the second object are the same object according to the first similarity and the probability.

2. The method according to claim 1, wherein the first similarity comprises a global feature similarity and an attribute feature similarity; the determining a first similarity between the first object and the second object according to the multiple frames of the first images and the multiple frames of the second images comprises:
   obtaining global features of the first object in the multiple frames of the first images and global features of the second object in the multiple frames of the second images according to a global feature model, wherein the global feature model is obtained by training according to multiple frames of first sample images;
   obtaining the global feature similarity according to the global features of the first object and the global features of the second object;
   obtaining attribute features of the first object in the multiple frames of the first images and attribute features of the second object in the multiple frames of the second images according to an attribute feature model, wherein the attribute feature model is obtained by training according to multiple frames of second sample images; and
   obtaining the attribute feature similarity according to the attribute features of the first object and the attribute features of the second object.

3. The method according to claim 2, wherein the obtaining the global feature similarity according to the global features of the first object and the global features of the second object comprises:
   obtaining a global feature similarity of each pair of images according to a global feature of the first object and a global feature of the second object in the each pair of images, wherein each pair of images comprise one frame of the first images and one frame of the second images; and
   performing mean value processing on global feature similarities of multiple pairs of images to obtain the global feature similarity.

4. The method according to claim 2, wherein the obtaining the attribute feature similarity according to the attribute features of the first object and the attribute features of the second object comprises:
   obtaining an attribute feature similarity of each pair of images according to an attribute feature of the first object and an attribute feature of the second object in the each pair of images, wherein each pair of images comprise one frame of the first images and one frame of the second images; and
   performing mean value processing on attribute feature similarities of multiple pairs of images to obtain the attribute feature similarity.

5. The method according to claim 4, wherein the first object is a first vehicle, and the second object is a second vehicle; the attribute feature comprises a vehicle color feature, a vehicle type feature and a license plate feature; and the obtaining an attribute feature similarity of each pair of images according to an attribute feature of the first object and an attribute feature of the second object in the each pair of images comprises:
   obtaining a vehicle color feature similarity of each pair of images according to a vehicle color feature of the first vehicle and a vehicle color feature of the second vehicle in the each pair of images;
   obtaining a vehicle type feature similarity of each pair of images according to a vehicle type feature of the first vehicle and a vehicle type feature of the second vehicle in the each pair of images;
   obtaining a license plate feature similarity of each pair of images according to a license plate feature of the first vehicle and a license plate feature of the second vehicle in the each pair of images; and
   obtaining the attribute feature similarity of each pair of images according to the vehicle color feature similarity, the vehicle type feature similarity and the license plate feature similarity of the each pair of images.

6. The method according to claim 2, wherein the judging whether the first object and the second object are the same object according to the first similarity and the probability comprises:
   obtaining a first weight corresponding to the global feature similarity, a second weight corresponding to the attribute feature similarity, and a third weight corresponding to the probability;
   fusing the global feature similarity, the attribute feature similarity and the probability according to the first weight, the second weight and the third weight to obtain a fusion parameter; and
   determining that the first object and the second object are the same object when the fusion parameter exceeds a preset value.

7. An object tracking apparatus, comprising:
   at least one processor; and
   a memory connected, and in communication, with the at least one processor; wherein,
   the memory stores instructions executable by the at least one processor, and the instructions are executed by the at least one processor to enable the at least one processor to execute the following steps:
   obtaining_multiple frames of first images_shot by a first camera apparatus and a first shooting moment of each frame of the first images, wherein the first images comprise a first object;
   obtaining_multiple frames of second images shot by the second camera apparatus and a second shooting moment of each frame of the second images, wherein the second images comprise a second object and the first shooting moment is before the second shooting moment;
   obtaining a distance between the first camera apparatus and the second camera apparatus; and
   determining a first similarity between the first object and the second object according to the multiple frames of the first images and the multiple frames of the second images;
   determining a moving speed of the first object according to the first shooting moment of each frame of the first images;
   determining a probability that the first object and the second object are the same object according to the moving speed of the first object, the distance, the first shooting moment and the second shooting moment and
   judging whether the first object and the second object are the same object according to the first similarity and the probability.

8. The apparatus according to claim 7, wherein the first similarity comprises a global feature similarity and an attribute feature similarity; the determining a first similarity between the first object and the second object according to the multiple frames of the first images and the multiple frames of the second images comprises:
   obtaining global features of the first object in the multiple frames of the first images and global features of the second object in the multiple frames of the second images according to a global feature model, wherein the global feature model is obtained by training according to multiple frames of first sample images;
   obtaining the global feature similarity according to the global features of the first object and the global features of the second object;
   obtaining attribute features of the first object in the multiple frames of the first images and attribute features of the second object in the multiple frames of the second images according to an attribute feature model, wherein the attribute feature model is obtained by training according to multiple frames of second sample images; and
   obtaining the attribute feature similarity according to the attribute features of the first object and the attribute features of the second object.

9. The apparatus according to claim 8, wherein the obtaining the global feature similarity according to the global features of the first object and the global features of the second object comprises:
   obtaining a global feature similarity of each pair of images according to a global feature of the first object and a global feature of the second object in the each pair of images, wherein each pair of images comprise one frame of the first images and one frame of the second images; and
   performing mean value processing on global feature similarities of multiple pairs of images to obtain the global feature similarity.

10. The apparatus according to claim 8, wherein the obtaining the attribute feature similarity according to the attribute features of the first object and the attribute features of the second object comprises:
   obtaining an attribute feature similarity of each pair of images according to an attribute feature of the first object and an attribute feature of the second object in the each pair of images, wherein each pair of images comprise one frame of the first images and one frame of the second images; and performing mean value processing on attribute feature similarities of multiple pairs of images to obtain the attribute feature similarity.

11. The apparatus according to claim 10, wherein the first object is a first vehicle, and the second object is a second vehicle; the attribute feature comprises a vehicle color feature, a vehicle type feature and a license plate feature; and the obtaining an attribute feature similarity of each pair of images according to an attribute feature of the first object and an attribute feature of the second object in the each pair of images comprises:
   obtaining a vehicle color feature similarity of each pair of images according to a vehicle color feature of the first vehicle and a vehicle color feature of the second vehicle in the each pair of images;
   obtaining a vehicle type feature similarity of each pair of images according to a vehicle type feature of the first vehicle and a vehicle type feature of the second vehicle in the each pair of images;
   obtaining a license plate feature similarity of each pair of images according to a license plate feature of the first vehicle and a license plate feature of the second vehicle in the each pair of images; and
   obtaining the attribute feature similarity of each pair of images according to the vehicle color feature similarity, the vehicle type feature similarity and the license plate feature similarity of the each pair of images.

12. The apparatus according to claim 8, wherein the judging whether the first object and the second object are the same object according to the first similarity and the probability comprises:
   obtaining a first weight corresponding to the global feature similarity, a second weight corresponding to the attribute feature similarity, and a third weight corresponding to the probability;
   fusing the global feature similarity, the attribute feature similarity and the probability according to the first weight, the second weight and the third weight to obtain a fusion parameter; and
   determining the first object and the second object are the same object when the fusion parameter exceeds a preset value.

13. A non-transitory computer-readable storage medium, having computer instructions stored thereon, wherein the computer instructions are used to cause a computer to execute the following steps:
   obtaining multiple frames of first images shot by a first camera apparatus and a first shooting moment of each frame of the first images, wherein the first images comprise a first object;
   obtaining multiple frames of second images shot by a second camera apparatus and a second shooting moment of each frame of the second images, wherein the second images comprise a second object and the first shooting moment is before the second shooting moment;
   obtaining a distance between the first camera apparatus and the second camera apparatus; and
   determining a first similarity between the first object and the second object according to the multiple frames of the first images and the multiple frames of the second images;
   determining a moving speed of the first object according to the first shooting moment of each frame of the first images;
   determining a probability that the first object and the second object are the same object according to the moving speed of the first object, the distance, the first shooting moment and the second shooting moment; and
   judging whether the first object and the second object are the same object according to the first similarity and the probability.

14. The non-transitory computer-readable storage medium according to claim 13, wherein the first similarity comprises a global feature similarity and an attribute feature similarity; the determining a first similarity between the first object and the second object according to the multiple frames of the first images and the multiple frames of the second images comprises:
   obtaining global features of the first object in the multiple frames of the first images and global features of the second object in the multiple frames of the second images according to a global feature model, wherein the global feature model is obtained by training according to multiple frames of first sample images;
   obtaining the global feature similarity according to the global features of the first object and the global features of the second object;
   obtaining attribute features of the first object in the multiple frames of the first images and attribute features of the second object in the multiple frames of the second images according to an attribute feature model, wherein the attribute feature model is obtained by training according to multiple frames of second sample images; and
   obtaining the attribute feature similarity according to the attribute features of the first object and the attribute features of the second object.

15. The non-transitory computer-readable storage medium according to claim 14, wherein the obtaining the global feature similarity according to the global features of the first object and the global features of the second object comprises:
   obtaining a global feature similarity of each pair of images according to a global feature of the first object and a global feature of the second object in the each pair of images, wherein each pair of images comprise one frame of the first images and one frame of the second images; and
   performing mean value processing on global feature similarities of multiple pairs of images to obtain the global feature similarity.

16. The non-transitory computer-readable storage medium according to claim 14, wherein the obtaining the attribute feature similarity according to the attribute features of the first object and the attribute features of the second object comprises:
   obtaining an attribute feature similarity of each pair of images according to an attribute feature of the first object and an attribute feature of the second object in the each pair of images, wherein each pair of images comprise one frame of the first images and one frame of the second images; and
   performing mean value processing on attribute feature similarities of multiple pairs of images to obtain the attribute feature similarity.

17. The non-transitory computer-readable storage medium according to claim 16, wherein the first object is a first vehicle, and the second object is a second vehicle; the attribute feature comprises a vehicle color feature, a vehicle type feature and a license plate feature; and the obtaining an attribute feature similarity of each pair of images according to an attribute feature of the first object and an attribute feature of the second object in the each pair of images comprises:

obtaining a vehicle color feature similarity of each pair of images according to a vehicle color feature of the first vehicle and a vehicle color feature of the second vehicle in the each pair of images;

obtaining a vehicle type feature similarity of each pair of images according to a vehicle type feature of the first vehicle and a vehicle type feature of the second vehicle in the each pair of images;

obtaining a license plate feature similarity of each pair of images according to a license plate feature of the first vehicle and a license plate feature of the second vehicle in the each pair of images; and obtaining the attribute feature similarity of each pair of images according to the vehicle color feature similarity, the vehicle type feature similarity and the license plate feature similarity of the each pair of images.

* * * * *